(12) United States Patent
Kamobayashi

(10) Patent No.: US 11,103,779 B2
(45) Date of Patent: *Aug. 31, 2021

(54) GAME PROGRAM, COMPUTER CONTROL METHOD, AND COMPUTER

(71) Applicant: GREE, Inc., Tokyo (JP)

(72) Inventor: Hiroki Kamobayashi, Tokyo (JP)

(73) Assignee: GREE, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/715,154

(22) Filed: Dec. 16, 2019

(65) Prior Publication Data
US 2020/0114258 A1 Apr. 16, 2020

Related U.S. Application Data

(63) Continuation of application No. 14/835,112, filed on Aug. 25, 2015, now Pat. No. 10,549,190.

(30) Foreign Application Priority Data

Aug. 29, 2014 (JP) ................. 2014-176020

(51) Int. Cl.
*A63F 13/00* (2014.01)
*A63F 13/426* (2014.01)
(Continued)

(52) U.S. Cl.
CPC ........ *A63F 13/426* (2014.09); *A63F 13/2145* (2014.09); *A63F 13/45* (2014.09)

(58) Field of Classification Search
CPC .................................................. G07F 17/3213
See application file for complete search history.

(56) References Cited

U.S. PATENT DOCUMENTS

2004/0237114 A1 11/2004 Drazin
2006/0073863 A1* 4/2006 Hagiwara ........... A63F 13/2145
463/9
(Continued)

FOREIGN PATENT DOCUMENTS

JP 2000-334171 A 12/2000
JP 2013106918 A 6/2013

OTHER PUBLICATIONS

Japanese Office Action dated Dec. 2, 2014 in corresponding Japanese Application No. 2014-176020; 7 pgs.
(Continued)

*Primary Examiner* — Omkar A Deodhar
*Assistant Examiner* — Eric M Thomas
(74) *Attorney, Agent, or Firm* — Maier & Maier, PLLC

(57) ABSTRACT

A computer game program obtains data input by a player. Puzzle display information is output to cause number of puzzle elements forming part of a puzzle to be displayed in a game field so that at least one puzzle element among the number of puzzle elements is selectable. Outputting object display information causes an object to be displayed on a screen on which the number of puzzle elements are displayed. Puzzle attribute information and/or puzzle arrangement information associated with the selected puzzle element may be updated and a determination is made as to whether or not the updated puzzle attribute information and/or the puzzle arrangement information satisfies a predetermined condition. An object displayed on or around the puzzle element associated with the puzzle attribute information and/or the puzzle arrangement information may be moved to produce a predetermined effect in a game when the predetermined condition is satisfied.

20 Claims, 5 Drawing Sheets

(51) Int. Cl.
 A63F 13/45 (2014.01)
 A63F 13/2145 (2014.01)

(56) References Cited

U.S. PATENT DOCUMENTS

2007/0257906 A1* 11/2007 Shimura .............. A63F 13/426
 345/419
2008/0300033 A1* 12/2008 Shirakawa ............. A63F 13/56
 463/9
2010/0261514 A1 10/2010 Gramelspacher et al.
2013/0303267 A1 11/2013 Vasquez et al.

OTHER PUBLICATIONS

"An application of Mameshiba Puzzle has been released", Google Play, Aug. 25, 2014, URL: https://play.google.com/store/apps/details?id=jp.mbga.a12016591.1ite&hl=ja>.

Japanese Office Action dated Jun. 30, 2015 in corresponding Japanese Application No. 2015-070119; 6 pgs.
Japanese Office Action dated Sep. 8, 2015 in corresponding Japanese Application No. 2015-070119; 5 pgs.
Japanese Office Action dated Jul. 10, 2018 of corresponding application No. JP2017-128832; 7 pgs. including machine trasnslation.
The 3D block TETRIS game Flash3DX, p. 1, [online] Jun. 9, 2012, [date-of-search:May 26, 2018] URL: https://web.archive.org/web/20120609010033/http://blog.livedoor.jp/lkrejg/archives/64960869.html, 5 pgs. including machine translation.
"List of a certain magic and science", Dengeki game application, Dengeki Game Appli, KK Kadokawa, Dec. 14, 2013, 13th volume, p. 54, 4 pgs. including partial translation.
Japanese Office Action dated Jan. 23, 2019 in corresponding Japanese Application No. 2017-128832; 7 pages.
"Mr. driller drill land", Electric Shock Game Cube, Media Works, Dec. 1, 2002, 2nd volume No. 12, p. 92.

* cited by examiner

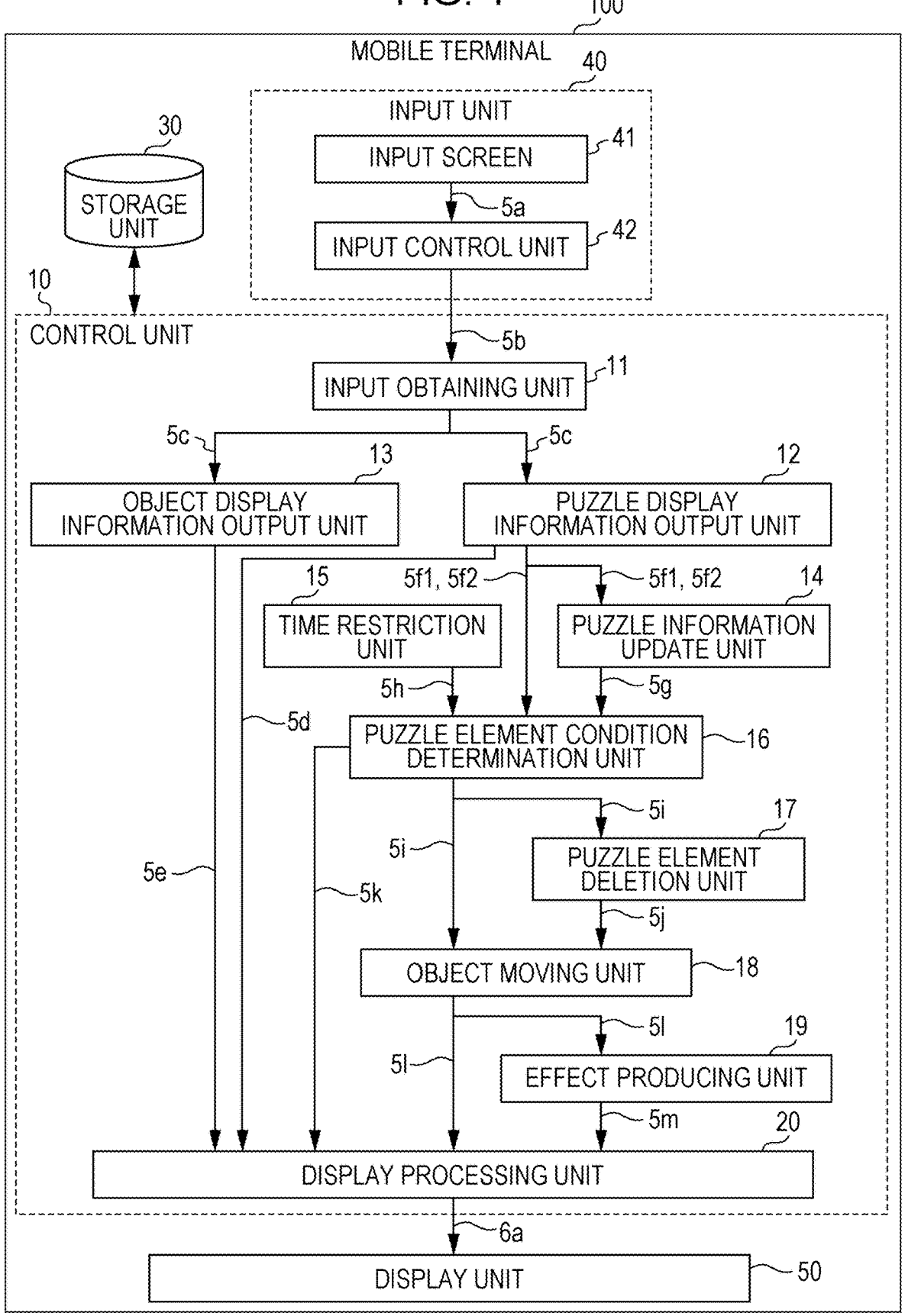

GAME PROGRAM, COMPUTER CONTROL METHOD, AND COMPUTER

CROSS-REFERENCE TO RELATED APPLICATIONS

This is a continuation of U.S. patent application Ser. No. 14/835,112, filed on Aug. 25, 2015, which claims priority to Japanese Patent Application No. 2014-176020, filed on Aug. 29, 2014, the entire contents of which are incorporated herein by reference.

FIELD

Exemplary embodiments of the disclosure relate to a game program, a computer control method, and a computer.

BACKGROUND

With an increase in the popularity of electronic devices for personal use, such as smartphones and tablet terminals, games for such electronic devices other than games for home video game consoles have been extensively developed. For example, Japanese Unexamined Patent Application Publication No. 2013-106918 discloses a gaming apparatus that provides a game, wherein the game is played in a way that makes a numbered button used to clear a target number disappear from a screen.

The game disclosed in Japanese Unexamined Patent Application Publication No. 2013-106918 is programmed to make a numbered button used to clear a target number disappear from a screen. The game allows players to experience two-dimensional gameplay, and the mere performance of making numbered buttons disappear as an effect of the game makes the game less enjoyable in terms of excitement. Such a game provides poor entertainment.

SUMMARY

Accordingly, it is an exemplary object of the disclosure to provide a game program which enables an improvement in the entertainment of a puzzle game using an object.

To this end, a game program according to an exemplary embodiment may cause a computer to implement an input obtaining function of obtaining data input by a player; a puzzle display information output function of outputting puzzle display information may cause a number of puzzle elements forming part of a puzzle to be displayed in a game field so that at least one puzzle element among the plurality of puzzle elements is selectable in accordance with the input data; an object display information output function of outputting object display information may cause an object to be displayed on a screen on which the number of puzzle elements are displayed; a puzzle information update function of updating puzzle attribute information associated with the selected puzzle element and/or puzzle arrangement information associated with the selected puzzle element may indicate an arrangement of the selected puzzle element; a puzzle element condition determination function may determine whether or not the puzzle attribute information and/or the puzzle arrangement information satisfies a predetermined condition after the puzzle attribute information and/or the puzzle arrangement information has been updated by the puzzle information update function; and an object moving function of moving the object may produce a predetermined effect in a game in a case where it is determined by the puzzle element condition determination function that the puzzle attribute information and/or the puzzle arrangement information satisfies the predetermined condition, the object being displayed on or around the puzzle element associated with the puzzle attribute information and/or the puzzle arrangement information. For purposes of this disclosure a number of puzzle elements may be any number of puzzle elements as would be understood by a person of ordinary skill in the art.

In an exemplary embodiment of the game program, after moving the object, the object moving function may produce, as the predetermined effect, an effect of changing status information possessed by a game content at a place to which the object has been moved.

In an exemplary embodiment of the game program, furthermore, the object may be assigned specific characteristics.

In an exemplary embodiment, the game program may further cause the computer to implement a puzzle element deletion function which may delete from the game field the puzzle element associated with the puzzle attribute information and/or the puzzle arrangement information that satisfies the predetermined condition in a case where it is determined by the puzzle element condition determination function that the puzzle attribute information and/or the puzzle arrangement information satisfies the predetermined condition. The object moving function may move the object, the object being displayed on or around the puzzle element deleted by the puzzle element deletion function.

In an exemplary embodiment of the game program, the game field may have three-dimensional information concerning width, height, and length. In response to deletion of a puzzle element among the number of puzzle elements which is displayed so as to support the object, the object moving function may move the object so that the object falls off the game field in a direction away from a viewpoint of the player.

In an exemplary embodiment of the game program, furthermore, the input obtaining function may obtain, as the input data, a path drawn through an operation on a predetermined input screen. The puzzle display information output function may output puzzle display information for causing the number of puzzle elements to be displayed in the game field so that at least one puzzle element among the number of puzzle elements is selectable along the path obtained by the input obtaining function.

In an exemplary embodiment, the game program may further cause the computer to implement a time restriction function to restrict a time during which the player is able to select the at least one puzzle element.

A computer control method according to another exemplary embodiment of the disclosure may include an input obtaining step of obtaining data input by a player; a puzzle display information output step of outputting puzzle display information may cause a number of puzzle elements forming part of a puzzle to be displayed in a game field so that at least one puzzle element among the number of puzzle elements is selectable in accordance with the input data; an object display information output step of outputting object display information may cause an object to be displayed on a screen on which the number of puzzle elements are displayed; a puzzle information update step may update puzzle attribute information associated with the selected puzzle element and/or puzzle arrangement information associated with the selected puzzle element and may indicate an arrangement of the selected puzzle element; a puzzle element condition determination step may determine whether or not the puzzle attribute information and/or the puzzle arrangement information satisfies a predetermined condition after the puzzle attribute information and/or the puzzle arrangement information has been updated in the puzzle information update step; and an object moving step of moving the object may produce a predetermined effect in a game, for example, in a case where it is determined in the puzzle element condition determination step that the puzzle attribute information and/or the puzzle arrangement information satisfies the predetermined condition, the object may be displayed on or around the puzzle element associated with the puzzle attribute information and/or the puzzle arrangement information.

A computer according to still another exemplary embodiment of the disclosure may include an input obtaining unit that obtains data input by a player; a puzzle display information output unit that outputs puzzle display information and may cause a number of puzzle elements forming part of a puzzle to be displayed in a game field so that at least one puzzle element among the number of puzzle elements is selectable in accordance with the input data; an object display information output unit that outputs object display information and may cause an object to be displayed on a screen on which the number of puzzle elements are displayed; a puzzle information update unit that may update puzzle attribute information associated with the selected puzzle element and/or puzzle arrangement information associated with the selected puzzle element and may indicate an arrangement of the selected puzzle element; a puzzle element condition determination unit that may determine whether or not the puzzle attribute information and/or the puzzle arrangement information satisfies a predetermined condition after the puzzle attribute information and/or the puzzle arrangement information has been updated by the puzzle information update unit; and an object moving unit that may move the object to produce a predetermined effect in a game, for example, in a case where it is determined by the puzzle element condition determination unit that the puzzle attribute information and/or the puzzle arrangement information satisfies the predetermined condition, the object may be displayed on or around the puzzle element associated with the puzzle attribute information and/or the puzzle arrangement information.

A game program, a computer control method, and a computer according to exemplary embodiments of the disclosure may enable movement of an object displayed on or around a puzzle element whose puzzle attribute information and/or puzzle arrangement information is determined to satisfy a predetermined condition to produce a predetermined effect in a puzzle game, which may improve the entertainment of the game.

BRIEF DESCRIPTION OF THE DRAWINGS

Exemplary FIG. 1 is a block diagram illustrating an example configuration of main components of a mobile terminal according to an embodiment.

Exemplary

Exemplary

Exemplary

Exemplary

Exemplary

Exemplary

Exemplary

Exemplary

Exemplary

DETAILED DESCRIPTION

Figure 2A:
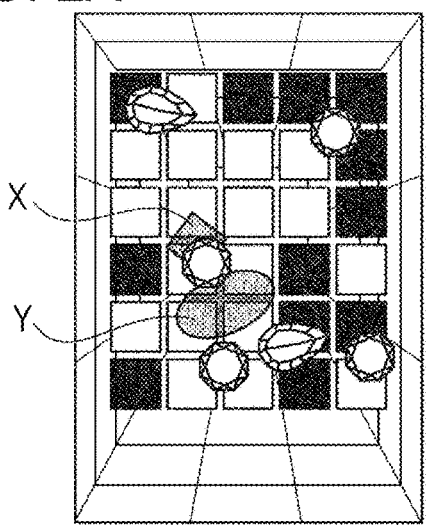
FIG. 2A is a schematic diagram illustrating a game screen for a puzzle game implemented by a game program according to an embodiment.

Firstly, a configuration in which a computer serves as a mobile terminal, and a game program is implemented as a so-called native application (native game) and may be executed by the mobile terminal may be described in exemplary embodiments with reference to FIGS. 1 to 4.

Subsequently, a configuration in which the computer serves as a server device, the game program is implemented as a so-called web application (web game), part or all of the game program may be executed by the server device, and the result of processes executed by the server device may be returned to the mobile terminal may be described in exemplary embodiments with reference to FIG. 5.

Exemplary embodiments may be described with reference to FIGS. 1 to 4.

A puzzle game provided in the disclosure may be a game with the following exemplary features. If it is determined that puzzle attribute information and/or puzzle arrangement information satisfies a predetermined condition, an object displayed on or around a puzzle element having the puzzle attribute information and/or the puzzle arrangement information that satisfies the predetermined condition may be moved (for example, by falling). The object may be moved (for example, by falling) to produce a predetermined effect in the puzzle game (for example, an effect of causing the object to collide with a game content (for example, an enemy character) to damage the game content) to earn a score.

Exemplary FIG. 1 is a block diagram illustrating an example configuration of main components of a mobile terminal 100. The mobile terminal (computer) 100 is an information processing device capable of executing a game program according to this embodiment. The information processing device may be any device capable of executing processes included in the game program, and may be implemented using the mobile terminal 100 or any other electronic device such as a smartphone, a tablet terminal, a mobile phone (or feature phone), a home video game console, a personal computer, or the like.

As illustrated by way of example in exemplary FIG. 1, the mobile terminal 100 may include a control unit 10, an input unit 40, a display unit 50, and a storage unit 30.

The control unit 10 may collectively control various functions of the mobile terminal 100. The control unit 10 may include an input obtaining unit 11, a puzzle display information output unit 12, an object display information output unit 13, a puzzle information update unit 14, a time restriction unit 15, a puzzle element condition determination unit 16, a puzzle element deletion unit 17, an object moving unit 18, an effect producing unit 19, and a display processing unit 20.

The puzzle display information output unit (puzzle display information output function) 12 may output puzzle display information 5*d* for causing a number of puzzle elements forming part of a puzzle to be displayed in a game field so that at least one puzzle element among the number of puzzle elements is selectable in accordance with data input by a player. The game field may have three-dimensional information concerning width, height, and length.

The puzzle display information output unit 12 can also output puzzle display information 5*d* for causing the number of puzzle elements to be displayed in the game field so that at least one puzzle element among the number of puzzle elements is selectable along a path drawn through an operation on a predetermined input screen.

The puzzle display information 5*d* output from the puzzle display information output unit 12 may be input to the display processing unit 20. The display processing unit 20 may generate screen information 6*a* concerning a puzzle game screen in accordance with the puzzle display information 5*d*, and may output the screen information 6*a* to the display unit 50.

The object display information output unit (object display information output function) 13 may output object display information 5*e* for causing an object to be displayed on a screen on which the number of puzzle elements are displayed.

The object display information 5*e* output from the object display information output unit 13 may be input to the display processing unit 20. The display processing unit 20 may generate screen information 6*a* concerning a puzzle game screen in accordance with the object display information 5*e*, and may output the screen information 6*a* to the display unit 50.

The puzzle information update unit (puzzle information update function) 14 may update puzzle attribute information 5*f*1 associated with a selected puzzle element and/or puzzle arrangement information 5*f*2 associated with the selected puzzle element and indicate the arrangement of the selected puzzle element.

The time restriction unit (time restriction function) 15 may be configured to restrict the time during which the player can select at least one puzzle element.

The puzzle attribute information 5*f*1 and/or the puzzle arrangement information 5*f*2 output from the puzzle display information output unit 12 may be input to the puzzle element condition determination unit 16. Alternatively, the puzzle attribute information 5*f*1 and/or the puzzle arrangement information 5*f*2 may be input to the puzzle information update unit 14, and the puzzle information update unit 14 may update the puzzle attribute information 5*f*1 and/or the puzzle arrangement information 5*f*2 to produce puzzle update information 5*g*, and output the puzzle update information 5*g*. The puzzle update information 5*g* may be input to the puzzle element condition determination unit 16. Time restriction information 5*h* output from the time restriction unit 15 may be input to the puzzle element condition determination unit 16.

After the puzzle attribute information 5*f*1 and/or the puzzle arrangement information 5*f*2 has been updated by the puzzle information update unit 14, the puzzle element condition determination unit (puzzle element condition determination function) 16 may determine whether or not the updated puzzle attribute information 5*f*1 and/or puzzle arrangement information 5*f*2 satisfies a predetermined condition.

If the puzzle element condition determination unit (puzzle element condition determination function) 16 determines that the puzzle attribute information 5*f*1 and/or the puzzle arrangement information 5*f*2 satisfies the predetermined condition, the puzzle element deletion unit (puzzle element deletion function) 17 can delete from the game field a puzzle element associated with the puzzle attribute information 5*f*1 and/or the puzzle arrangement information 5*f*2 that satisfies the predetermined condition.

The puzzle attribute information 5*f*1 and/or the puzzle arrangement information 5*f*2 output from the puzzle display information output unit 12, the puzzle update information 5*g* output from the puzzle information update unit 14, or the time restriction information 5*h* output from the time restriction unit 15 may be input to the puzzle element condition determination unit (puzzle element condition determination function) 16. Puzzle element condition positive-determination information 5*i* indicating that the puzzle element condition determination unit 16 determines that the puzzle attribute information 5*f*1 and/or puzzle arrangement information 5*f*2 satisfies the predetermined condition may be input to the puzzle element deletion unit 17 or the object moving unit 18. Puzzle element deletion information 5*j* indicating that the puzzle element deletion unit 17 has deleted a puzzle element may be input to the object moving unit 18.

On the other hand, puzzle element condition negative-determination information 5*k* indicating that the puzzle element condition determination unit 16 determines that the puzzle attribute information 5*f*1 and/or puzzle arrangement information 5*f*2 does not satisfy the predetermined condition may be input to the display processing unit 20, and screen information 6*a* concerning a puzzle game screen may be generated. The screen information 6*a* may be output to the display unit 50.

If the puzzle element condition determination unit (puzzle element condition determination function) 16 determines that the puzzle attribute information 5*f*1 and/or the puzzle arrangement information 5*f*2 satisfies the predetermined condition, the object moving unit (object moving function) 18 may move an object displayed on or around a puzzle element associated with the puzzle attribute information 5*f*1 and/or the puzzle arrangement information 5*f*2 to produce a predetermined effect in the game.

The object moving unit (object moving function) 18 can move an object displayed on or around a puzzle element deleted by the puzzle element deletion unit (puzzle element deletion function) 17.

The object moving unit (object moving function) 18 can move an object so that the object, for example, falls off the game field in a direction away from the player's viewpoint in response to the deletion of a puzzle element displayed so as to support the object. Alternatively, the object may be moved in other ways, as desired.

After the object has moved, the effect producing unit (effect producing function) 19 can produce, as a predetermined effect, an effect of changing status information possessed by a game content at a place to which the object has been moved. In some exemplary embodiments, the object may be assigned specific characteristics.

Object display movement information 5*l* output from the object moving unit 18 may be input to the display processing unit 20 or the effect producing unit 19, and effect producing information 5m output from the effect producing unit 19 may be input to the display processing unit 20.

The display processing unit 20 may generate screen information 6a concerning a puzzle game screen which can present a result of the series of processes to the player, in accordance with the puzzle display information 5d input from the puzzle display information output unit 12, the object display information 5e input from the object display information output unit 13, the puzzle element condition negative-determination information 5k input from the puzzle element condition determination unit 16, the object display movement information 5l input from the object moving unit 18, and the effect producing information 5m input from the effect producing unit 19, and may output the screen information 6a to the display unit 50. Thus, the game screen may be displayed on the display unit 50.

The input unit 40 may accept an operation performed by the player. In an exemplary embodiment, the input unit 40 may be a touch panel. The input unit 40 may include an input screen 41 and an input control unit 42. Inputs may not necessarily be provided to the mobile terminal 100 by a touch operation using the touch panel. For example, in alternative embodiments, inputs may be provided by pressing a predetermined input key, or by other methods, as desired.

As would be understood by a person of ordinary skill in the art, the input screen 41 may be any device capable of sensing a position specified by an operation performed by the player (for example, a touch screen included in the touch panel). The input screen 41 may output a touch signal 5a corresponding to the specified position to the input control unit 42.

The input control unit 42 may generate coordinate information 5b based on the touch signal 5a input from the input screen 41. The coordinate information 5b may include, for example, information concerning the coordinates of the specified position on the input screen 41. The input control unit 42 may output the coordinate information 5b to the input obtaining unit 11.

The input obtaining unit (input obtaining function) 11 may obtain data input by the player, and generate instruction information (input data) 5c in accordance with the coordinate information 5b input from the input control unit 42. The input obtaining unit (input obtaining function) 11 may output the instruction information 5c to the puzzle display information output unit 12 and the object display information output unit 13.

As would be understood by a person of ordinary skill in the art, the display unit 50 may be any device on which a game screen is displayed. For example, in an exemplary embodiment, the display unit 50 may be a liquid crystal display. In exemplary FIG. 1, the input unit 40 and the display unit 50 are illustrated as separate units in order to clearly distinguish between the functions of the input unit 40 and the functions of the display unit 50. For example, if the input unit 40 is a touch panel and the display unit 50 is a liquid crystal display, the input unit 40 and the display unit 50 may be formed into a single unit.

The storage unit 30 may be a storage device implemented as a recording medium, such as a hard disk, a solid state drive (SSD), a semiconductor memory, a digital versatile disc (DVD), or the like, and is configured to store data and a game program capable of controlling the mobile terminal 100.

Exemplary FIGS. 2A to 2F are schematic diagrams illustrating transitions of a game screen for a puzzle game implemented by the game program.

Exemplary FIG. 2A is a schematic diagram illustrating six objects (which look like diamonds) displayed on a screen on which a number of puzzle elements are displayed.

In some exemplary embodiments, an object may be configured to produce a predetermined effect in a puzzle game. The term "predetermined effect", as used herein, refers to, for example, but is not limited to, an effect of moving an object displayed on or around a puzzle element so that the object comes into contact (or collides) with a game content (an enemy character such as a monster) to damage the game content, where the object has been assigned specific characteristics such as weapons with which the game content can be defeated. The object can also damage the game content without coming into contact (or colliding) with the game content. Examples of such an effect include an effect of damaging a game content surrounding the object by the object exploding, or the like. In the manner described above, examples of the predetermined effect may include, in addition to an effect of damaging a game content, an effect of indirectly affecting a game content. Examples of such an effect include an effect of reducing the defensive power of the game content, and an effect of restoring the game content. Other examples may include an effect of changing a destination to which a game content having a feature of being able to move is expected to move to limit the path of movement of the game content, and an effect of changing the movement speed of the game content. In the manner described above, a predetermined effect is typically produced in a manner in which an object comes into contact (or may not come into contact) with a game content to damage the game content, or in which an object indirectly affects a game content, for example. Such various manners in which a predetermined effect is produced may improve gameplay and provide even a high-level player with a highly entertaining game.

In exemplary embodiments, examples of the object include a character and an item. Here, the term "character" may refer to an entity that looks like something in the real world (in exemplary FIGS. 2A to 2F, an entity that looks like a diamond), or may be used to include virtual entities in a game, such as humans, animals, creatures, monsters, weapons, and the like.

In exemplary embodiments, examples of the manner in which specific characteristics are assigned to an object in order to produce a "predetermined effect" include, but are not limited to, manners in which (1) specific characteristics are assigned to an object, (2) specific characteristics selected by a player are assigned to an object, (3) specific characteristics corresponding to a character selected by a player are assigned to an object, and various combinations of (1) to (3) described above.

In an example of the manner (1) described above, for example, specific characteristics (size, shape, weight, etc.) may be assigned to an object in advance by the game program. In an example of the manner (2) described above, for example, specific characteristics (size, shape, weight, etc.) selected by a player may be assigned to an object. In an example of the manner (3) described above, for example, as illustrated in exemplary FIGS. 3A and 3B, specific characteristics corresponding to a character drawn on a card selected by a player may be assigned to an object. The manner (3) described above will be described in detail below with reference to exemplary FIGS. 3A and 3B.

In exemplary embodiments, a number of puzzle elements forming a puzzle may have puzzle attribute information and/or puzzle arrangement information. The puzzle attribute information may be information associated with each of the number of puzzle elements. The puzzle arrangement information may be information associated with each of the number of puzzle elements and indicate the arrangement of the corresponding one of the puzzle elements.

In exemplary embodiments, the puzzle attribute information can include, for example, but is not limited to, attributes of each of a number of puzzle elements on the game program, such as color, shape, size, and character or item type, and a difference in attribute is distinguishable by a player. In exemplary FIG. 2A, puzzle attribute information included in each puzzle element can be distinguished by the player by a difference in color between white and black.

In exemplary embodiments, the puzzle arrangement information can be, for example, but not limited to, on the game program, information on the arrangement of a number of puzzle elements under a specific rule. In exemplary FIG. 2A, puzzle elements are arranged in order in an array of six rows and five columns. Alternatively, puzzle elements may be arranged in order in an array of any other size, or may be arranged randomly. In the puzzle game according to the exemplary embodiments, elements of other games such as bingo and slot machines may be combined to create puzzle arrangement information.

In exemplary embodiments, furthermore, the arrangement of an object (i.e., a way in which an object is placed) is not limited to any specific arrangement so long as the object is displayed on a screen on which a number of puzzle elements are displayed, but in one example the object may be arranged at a position where the object is ready to exert a predetermined effect. For example, an object may be ready to exert a predetermined effect when arranged (or placed) at a position that spans the squares of several puzzle elements. Alternatively, as illustrated in exemplary FIG. 2A, in a case where game media (for example, enemy characters) X and Y are transparent to enable the player to anticipate in advance the enemy positions, the player may strategically select the arrangement of an object (i.e., a way in which an object is placed) to make it easier for the object to collide with the game media X and Y. Further, if a game content has a feature of being able to move, the player may anticipate the path of movement of the game content and may select the arrangement of an object (i.e., a way in which an object is placed) to make it easier for the object to exert a predetermined effect. Alternatively, the player may effectively combine objects in accordance with various specific characteristics assigned to each of the objects, and may select the arrangement of the objects (i.e., a way in which the objects are placed) to make it easier for the objects to exert a predetermined effect. In the manner described above, a player may be able to make their own selection of the arrangement of an object (i.e., a way in which an object is placed) from among various arrangements. Such various arrangements may improve gameplay and provide even a high-level player with a highly entertaining game. In addition, in the arrangement of an object, the viewpoint of the player may be changed. Changing the viewpoint of the player may be advantageous because it may facilitate viewing of the positional relationship with respect to a game content and facilitate viewing of the path of movement of a game content.

In exemplary embodiments, furthermore, an object that produces a predetermined effect may be assigned a different set of characteristics, and the predetermined effect produced by the object may differ depending on the characteristics assigned to the object. For example, an object may be assigned a "weight" element, resulting in an increase in the falling speed when the object moves, so as to increase the effect of damaging a game content. Additionally, an object may be assigned a "shape" element or a "size" element, resulting in an increase in the range over which a game content is damaged. In addition, taking a weak point, or the like, of a game content into account, the player may be able to strategically select an optimum object from among objects having different sets of characteristics. Furthermore, a limitation may be imposed on the position at which an object can be arranged, or on the number of times an object can be arranged, in accordance with various specific characteristics assigned to each object. For example, in a case where the effect of damaging a game content by using specific characteristics assigned to an object is large, a configuration may be used in which the number of times the object can be arranged is limited and the object can be arranged only around the center of a puzzle element. On the other hand, in a case where the effect of damaging a game content by using specific characteristics assigned to an object is small, a configuration may be used in which the number of times the object can be arranged is unlimited and the object can be arranged at any position in a puzzle element.

Other examples of characteristics which may be assigned to an object include characteristics capable of launching an intellectual attack, characteristics capable of attracting an enemy using meat or the like as a decoy, characteristics capable of launching an attack while rolling after falling, and characteristics capable of improving the visibility of the enemy position even in a dark scene. Such a variety of sets of characteristics may be used, as desired.

It may be desirable that the player strategically take into account the characteristics of an object from among a variety of sets of characteristics assigned to the object as described above, by taking into account the attribute and the like of a game content (enemy character), arrange the object, and cause the object to fall in order to inflict effective damage on the game content. In the manner described above, there are a variety of sets of specific characteristics which may be assigned to an object, and a player is able to make their own selection of a desired object from among the sets of specific characteristics. This may improve gameplay and provide even a high-level player with a highly entertaining game.

In exemplary embodiments, a condition may be added in which a player is unable to damage a game content (enemy character) unless the player selects an object in accordance with the attribute, and the like, of the enemy character. For example, a condition may be added in which an enemy character having the "iron" attribute can be defeated only by an object having the characteristics of lightning. In addition, each enemy character may have a weak point, and a condition may be added in which an enemy character can be defeated only when the attribute overcomes the weak point. A condition may further be added in which the player is able to attack an enemy character on a stage including a dark scene only after the player has dropped an object for illuminating the surroundings. If a mirror exists in the game field, a condition may further be added in which the player is able to attack an enemy character only after the player has broken the mirror because the mirror prevents the player from distinguishing the true enemy character from false ones. In the manner described above, there are a variety of manners in which various conditions are added unless an object is selected in accordance with the attribute and the like of a game content, and the player is able to make their own selection of a desired object from among them. This may improve gameplay and provide even a high-level player with a highly entertaining game.

Figure 2B:
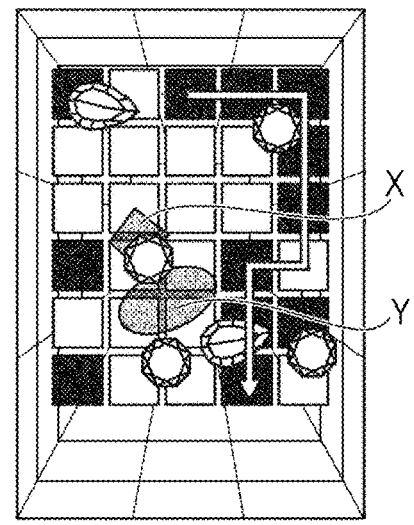
FIG. 2B is a schematic diagram illustrating a game screen for a puzzle game implemented by a game program according to an embodiment.

Exemplary FIG. 2B is a schematic diagram illustrating puzzle elements selected by a player. In exemplary FIG. 2B, the arrow on a screen on which puzzle elements are displayed may indicate the path along which the player has selected puzzle elements.

In exemplary embodiments, a puzzle element may be selected by using any method by which at least one puzzle element can be selected by a player. For example, a puzzle element may be selected by using a tap operation, or a puzzle element may be selected by using a drag operation (by selecting puzzle elements while tracing a path through the puzzle elements). A puzzle element may be selected by using any other method known to those of ordinary skill in the art. For ease of operation, it may be preferable to select a puzzle element by using a drag operation. In exemplary FIG. 2B, the player traces a path through the squares of the third, fourth, and fifth puzzle elements horizontally from the left in the first row, the squares of the second, third, and fourth puzzle elements vertically from the top in the first column from the right, and the squares of the fourth, fifth, and sixth puzzle elements vertically from the top in the second column from the right, thereby selecting the puzzle elements in the path.

A limitation may be imposed on the range over which the player can select puzzle elements by tracing a path through the squares of the puzzle elements.

In exemplary embodiments, furthermore, a time limit may be imposed on the player's selection of a puzzle element. Any method may be used to impose a time limit on the selection of a puzzle element. For example, an indicator of the time remaining in the time limit may be displayed at a certain location within the game field in a count-down mode, and/or a sound effect may be added to produce an effect of giving some tension to the player.

Figure 2C:
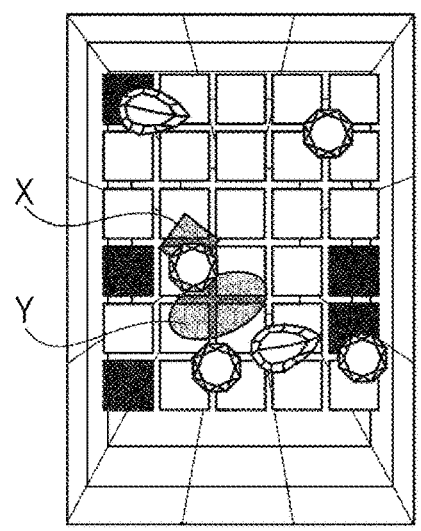
FIG. 2C is a schematic diagram illustrating a game screen for a puzzle game implemented by a game program according to an embodiment.

Exemplary FIG. 2C is a schematic diagram illustrating a change in puzzle attribute information of a puzzle element selected by a player.

In exemplary embodiments, puzzle attribute information associated with each of a number of puzzle elements may be changed by a player through selection. Puzzle attribute information may be changed in any way, and any content may be changed. For example, in exemplary FIG. 2B, when selected by a player (the path along which selection has been made is indicated by the arrow), the square of a black puzzle element is changed (or turned) to white, and the square of a white puzzle element is changed (or turned) to black.

Figure 2D:
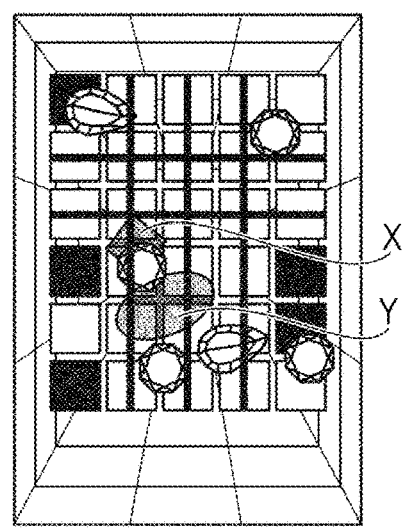
FIG. 2D is a schematic diagram illustrating a game screen for a puzzle game implemented by a game program according to an embodiment.

Exemplary FIG. 2D is an exemplary schematic diagram of a number of puzzle elements in a case where it is determined that puzzle attribute information and puzzle arrangement information associated with each of the number of puzzle elements satisfy a predetermined condition.

In exemplary embodiments, if it is determined that puzzle attribute information and/or puzzle arrangement information satisfies a predetermined condition, an object displayed on or around a puzzle element for which the predetermined condition is satisfied may be moved. In some embodiments, in terms of the enhanced entertainment of the puzzle game, both puzzle attribute information and puzzle arrangement information may satisfy a predetermined condition.

The predetermined condition can be designed, as desired, on the game program. In one example, it may be determined that the predetermined condition is satisfied if puzzle elements are arranged in a predetermined layout, and the puzzle elements have the same attribute, for example, if all the puzzle elements in any one of the vertical columns or horizontal rows are regarded as having the same attribute. The predetermined condition may also be designed in a different manner in accordance with the characteristics of a puzzle element included in the puzzle, or in accordance with the characteristics of an object displayed on the puzzle element. For instance, the predetermined condition may be a condition in which, of three puzzle elements arranged in any one row, all three puzzle elements are regarded as having the same attribute. Even in this case, for example, if an object assigned a "weight" element is placed over a number of puzzle elements including a puzzle element with vulnerable characteristics, it may be determined that the predetermined condition is satisfied when some (for example, two) of the number of puzzle elements are regarded as having the same attribute. Accordingly, a condition different from an initial predetermined condition may be designed in accordance with the characteristics of a puzzle element or the characteristics of an object. In the manner described above, the predetermined condition may be designed in various ways on the game program as would be understood by a person of ordinary skill in the art. This may improve gameplay and provide even a high-level player with a highly entertaining game.

In exemplary FIG. 2D, the squares of all the puzzle elements arranged in the second, third, and fourth vertical columns from the left and the second and third horizontal rows from the top are regarded as having the same color (white) attribute, and may therefore satisfy a predetermined condition. In exemplary embodiments, a determination result indicating that the predetermined condition is satisfied may be displayed in any way that enables the player to identify the determination result. For example, as illustrated in exemplary FIG. 2D, a thick black solid line may be drawn in a vertical column or horizontal row for which it is determined that the predetermined condition is satisfied, or an audio representation may be used alternatively.

Figure 2E:
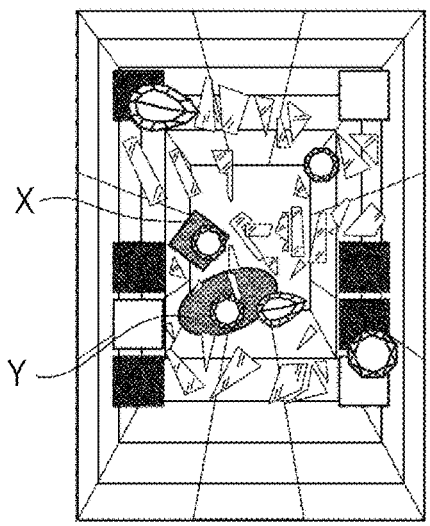
FIG. 2E is a schematic diagram illustrating a game screen for a puzzle game implemented by a game program according to an embodiment.

Exemplary FIG. 2E is a schematic diagram illustrating an object that falls in a direction away from the player's viewpoint in response to the deletion of a puzzle element for which a predetermined condition is satisfied.

In exemplary embodiments, if it is determined that puzzle attribute information and/or puzzle arrangement information satisfies a predetermined condition, a puzzle element for which the predetermined condition is satisfied may be deleted from the game field, and an object displayed on or around the deleted puzzle element can be moved. In the exemplary embodiments, a puzzle element for which a predetermined condition is satisfied may be deleted in any way. As illustrated in exemplary FIG. 2E, the square of such a puzzle element may be broken step by step such that the square of such a puzzle element is cracked, or the puzzle element may be deleted at once. In the manner described above, a puzzle element may be deleted in a manner having incremental impact. This may achieve visual excitement and provide even a high-level player with a highly entertaining game.

In exemplary embodiments, furthermore, the game field may have three-dimensional information concerning width, height, and length, in terms of the enhanced entertainment of the game.

In exemplary embodiments, the game field may be a puzzle field which may include a number of puzzle elements and an object displayed on or around the number of puzzle elements. The game field may also include a game content and the like. The game field may have any configuration. For example, the game field may have (1) a multilayer configuration having one or more layers of puzzle fields between the puzzle field and the game content, or (2) a configuration in which the game field includes a geographic element. In one example of the configuration (1) described above, taking into account the characteristics of weapons, the player may develop a strategy to first use a hammer to break puzzle elements within a wide range in the puzzle field in the first layer to form a large opening, since a heavy-hitting weapon such as a hammer enables puzzle elements within a wide range to be broken, and then to drop a weapon, or the like, that is sharp enough to pierce puzzle elements to the puzzle field in the second layer. In one example of the configuration (2) described above, in a case where the puzzle field has irregularities or the game field is partially or entirely inclined, an object existing in the game field and having the characteristics of a weapon, or the like, may roll and fall in a predetermined direction while being shifted. In the manner described above, the game field may have a complex configuration. This may improve gameplay and provide even a high-level player with a highly entertaining game.

In exemplary embodiments, in terms of the achievement of visual excitement, an object may move so that the object falls off the game field in a direction away from the player's viewpoint in response to the deletion of a puzzle element for which the predetermined condition is satisfied, and which is displayed so as to support the object. As illustrated in exemplary FIG. 2E, in response to the deletion of a puzzle element for which the predetermined condition is satisfied, an object that supports the puzzle element may also fall.

Figure 2F:
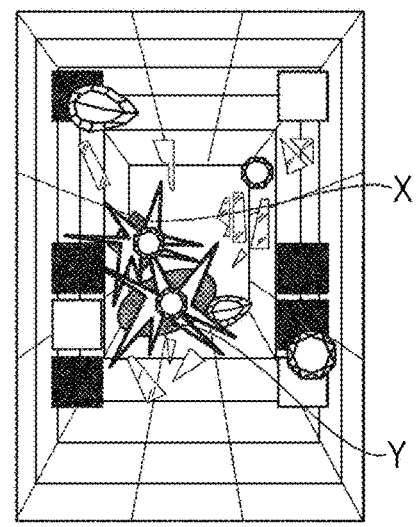
FIG. 2F is a schematic diagram illustrating a game screen for a puzzle game implemented by a game program according to an embodiment.

Exemplary FIG. 2F is a schematic diagram illustrating the production of a predetermined effect in game media X and Y when objects that are moved so that the objects fall and come into contact with the game media X and Y.

In exemplary embodiments, when an object is moved, for example, when an object is moved so that the object falls, the object may produce, as a predetermined effect, an effect of changing status information possessed by a game content at a place to which the object has been moved. For example, as illustrated in exemplary FIG. 2F, objects that are moved so as to look to the player as if the objects are falling come into contact with game media X and Y, resulting in producing an effect of damaging the game media X and Y.

When an object is moved so that the object falls, the viewpoint of the player may be changed. Specific examples of changing the viewpoint of the player include making a bird's-eye view angle shallow, moving the viewpoint in a direction away from the player, and changing the viewpoint so as to keep track of the falling object in a direction away from the player. This can facilitate visual recognition of the contact between the object and a game content. Accordingly, an effect of dynamic observation of the production of a predetermined effect may be achieved. Further, a puzzle element may be transparent while an object is moved so that the object falls. This also can facilitate visual recognition of the contact between the object and a game content. Accordingly, an effect of dynamic observation of the production of a predetermined effect may be achieved.

In exemplary embodiments, elements of a card game may be incorporated into the configuration of the puzzle game described above in detail with reference to exemplary FIGS. 2A to 2F, achieving the provision of a player with a highly entertaining game.

Figure 3B:
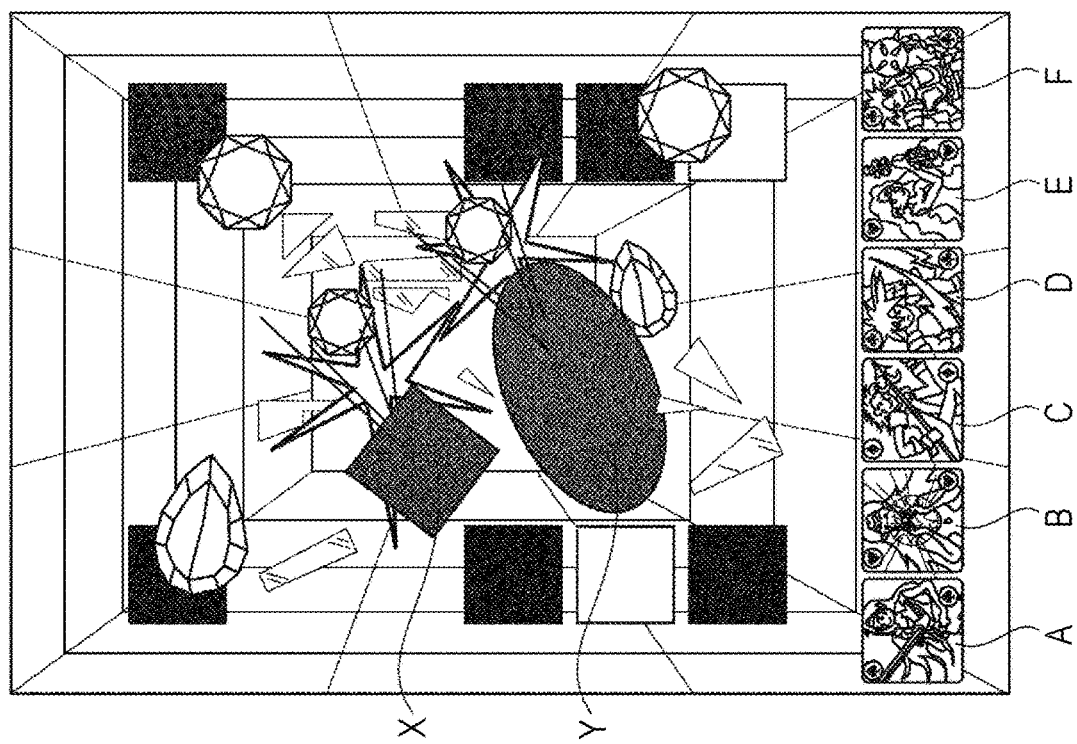
FIG. 3B is a schematic diagram illustrating an example of a game screen obtained by incorporating elements of a card game into the puzzle game implemented by the game program according to an embodiment Exemplary
Figure 3A:
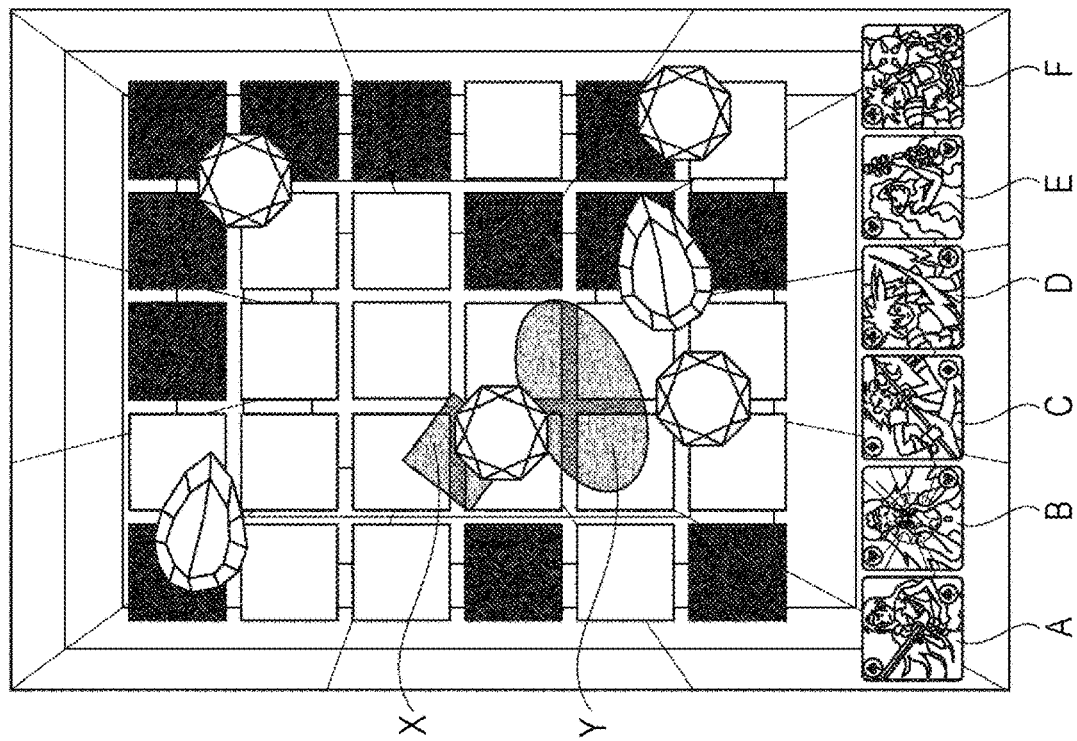
FIG. 3A is a schematic diagram illustrating an example of a game screen obtained by incorporating elements of a card game into the puzzle game implemented by the game program according to an embodiment.

Exemplary FIGS. 3A and 3B are schematic diagrams illustrating examples of a game screen obtained by incorporating elements of a card game into the puzzle game implemented by the game program.

Exemplary FIG. 3A is a schematic diagram illustrating six cards placed below the puzzle configuration screen illustrated in exemplary FIG. 2A. Each of the six cards shows a character (ally character) having characteristics capable of producing, as a predetermined effect, an effect of changing status information possessed by a game content (for example, an effect of attacking a game content to damage the game content).

In exemplary embodiments, a player may be able to select each of the cards A to F illustrated in exemplary FIG. 3A to assign specific characteristics corresponding to the character drawn on the selected one of the cards A to F to one of the six objects illustrated in exemplary FIG. 2A. The cards A to F may be selected in any way, and a selection method may be used in which a selected card is associated with each object arranged on a screen on which a number of puzzle elements are displayed. Alternatively, each object may be assigned, in advance, specific characteristics corresponding to a character drawn on a card. Further, a card may be associated with attribute information of a deleted puzzle element. For example, a deleted puzzle element that is in red may be associated with the characteristics of a card having the "fire" attribute. In the manner described above, specific characteristics associated with a card may be assigned to an object, or may also be assigned to a puzzle element. This may improve gameplay and provide even a high-level player with a highly entertaining game.

Each of the six cards A to F illustrated in exemplary FIG. 3A shows a character having characteristics. The card A shows a character holding a shotgun, the card B a character holding a ball of light, the card C a character holding a spear, the card D a character that casts lightning, the card E a character that plays a bell, and the card F a character holding a cannonball. The player may select one or more of the cards A to F to assign the characteristics of the character in the selected card to an object.

In exemplary embodiments, any character having characteristics capable of producing an effect of damaging a game content (predetermined effect) may be used, and cards which show characters having a variety of sets of characteristics, other than the cards A to F, may be incorporated into the puzzle game.

Examples of the characteristics of a character having the ability to inflict direct damage on a game content may include characteristics capable of continuous attacks (for example, the weapon drawn on the card A), such as a shotgun, characteristics capable of pinpoint attacks (for example, the weapon drawn on the card F), such as a cannonball, and characteristics capable of wide-range attacks (for example, the weapon drawn on the card C), such as a spear and a bow.

Examples of the characteristics of a character having the ability to inflict indirect damage on a game content may include characteristics capable of attacks with sound and the like (for example, sound of the bell drawn on the card E), characteristics of illuminating the surroundings (for example, the ball of light drawn on the card B), and characteristics of causing natural disasters such as lightning and avalanches (for example, the lightning drawn on the card D).

Other examples of the characteristics of a character may include characteristics capable of launching an intellectual attack, characteristics capable of attracting an enemy using meat, or the like, as a decoy, characteristics capable of launching an attack while rolling after falling, and characteristics capable of improving the visibility of the enemy position even in a dark scene. Such a variety of sets of characteristics may be used, and any of such sets of characteristics of a character may be assigned to each object.

Taking into account the attribute and the like of a game content (enemy character), the player may be able to strategically select the characteristics of an optimum character from cards as described above which show characters having a variety of sets of characteristics, so as to inflict effective damage on the game content, to assign the selected characteristics to an object.

In exemplary embodiments, a condition may be added in which a player is unable to damage an enemy character unless the player selects the characteristics of a character in accordance with an attribute of the enemy character. For example, a condition may be added in which an enemy character having the "iron" attribute can be defeated only by a character having the characteristics of shooting lightning. In addition, an enemy character may have a weak point, and a condition may be added in which the enemy character can be defeated only when the attribute overcomes the weak point. A condition may further be added in which the player is able to attack an enemy character on a stage including a dark scene only after the player has selected the characteristics of illuminating the surroundings. A condition may further be added in which the player is unable to delete a puzzle element if the player selects the characteristics of a nasty character. If a mirror exists in the game field, a condition may further be added in which the player is able to attack an enemy character only after the player has broken the mirror because the mirror prevents the player from distinguishing the true enemy character from false ones.

In addition to the selection of a character in accordance with the attributes of the enemy character described above, the sets of characteristics of a number of characters may be strategically selected in combination to change the effect of damaging a game content and the results concerning the effect, such as the power of the effect and the range over which the effect is exerted. Specifically, a player may strategically combine characters by taking into account the job level or skill possessed by the characters and the like to change the effect of damaging a game content and the results concerning the effect, such as the power of the effect and the range over which the effect is exerted.

In exemplary embodiments, furthermore, a time limit may be imposed on the player's selection of the characteristics of a character (or the selection of a card). Any method may be used to impose a time limit on the selection of the characteristics of a character. Similarly to the way described above in which a time limit is imposed on the selection of a puzzle element, an indicator of the time remaining in the time limit may be displayed at a certain location within the game field in a count-down mode, and/or a sound effect may be added to produce an effect of giving some tension to the player.

Exemplary FIG. 3B is a schematic diagram illustrating the state of a player being attacked by game media X and Y.

The puzzle game, according to some exemplary embodiments, can provide (1) a mode of attack of a player on game media X and Y, and also (2) a mode of attack of game media X and Y on a player as well as one of a variety of modes of the puzzle game. The mode of attack (1) has been described with reference to exemplary FIGS. 2A to 2F. The mode of attack (2) will now be described in detail with reference to exemplary FIG. 3B.

In exemplary FIG. 2F, objects that have been moved so that the objects fall, come into contact with the game media X and Y, and produce an effect of damaging the game media X and Y (predetermined effect).

In exemplary FIG. 3B, the mode of attack is illustrated in which, due to insufficient contact with the game media X and Y, the player is unable to sufficiently exert the effect of damaging the game media X and Y and, conversely, the game media X and Y appear closer to the viewpoint of the player with time. When the game media X and Y appear closest to the viewpoint of the player, the effect of damaging the player can be realized.

Figure 4:
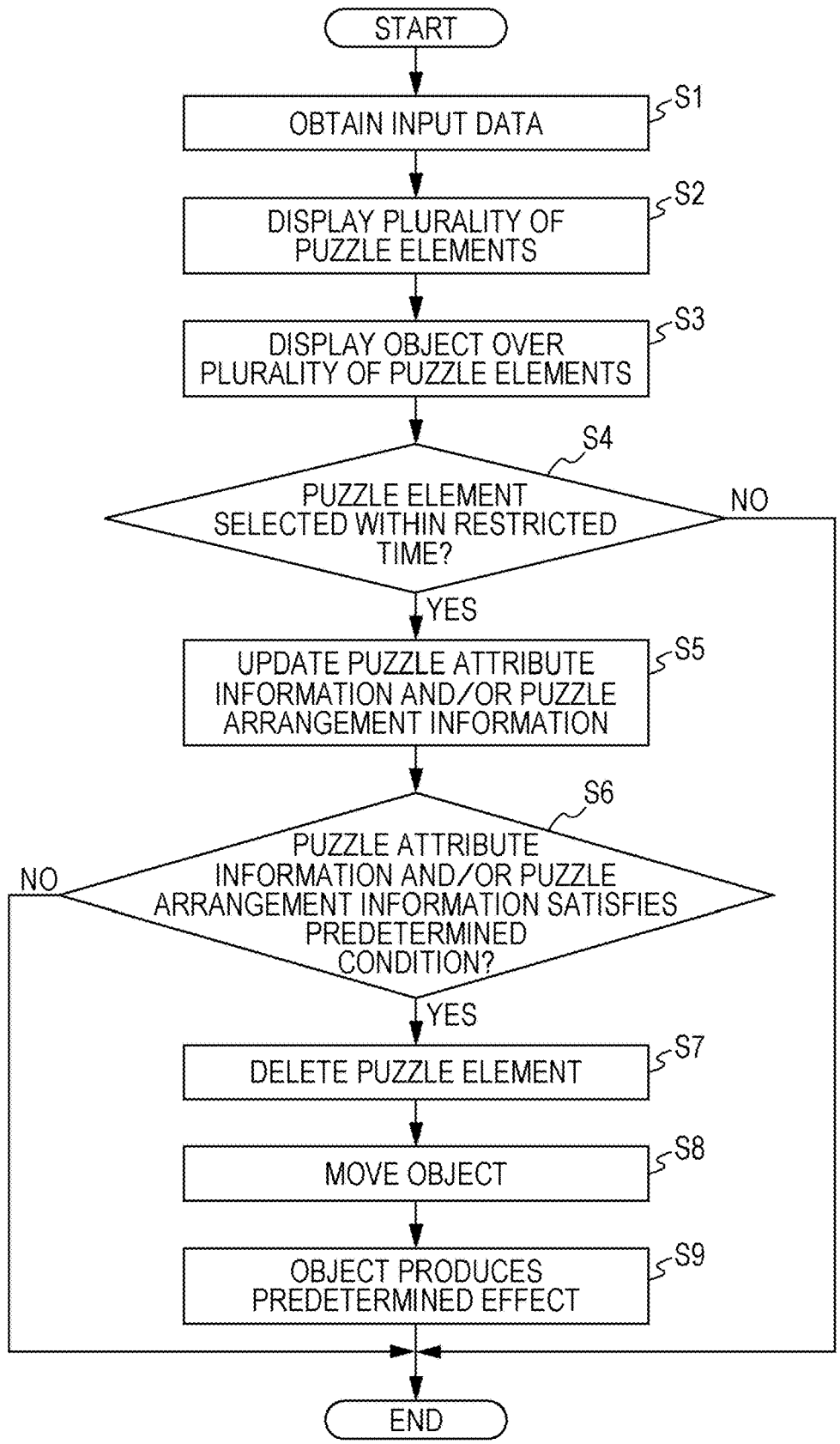
FIG. 4 is a flowchart illustrating an example of a process performed by the mobile terminal.

Exemplary FIG. 4 is an exemplary flowchart illustrating an example of a process executed by the mobile terminal 100. In the following description, steps in parentheses may represent steps included in a computer control method.

The input obtaining unit 11 may obtain instruction information 5c input by a player (step 1; hereinafter step is abbreviated as S: input obtaining step). The puzzle display information output unit 12 may display a number of puzzle elements in a game field (S2: puzzle display information output step), and the object display information output unit 13 may display an object on a screen on which the number of puzzle elements are displayed (S3: object display information output step). The time restriction unit 15 may restrict the time during which the player can select at least one puzzle element (S4: time restriction step). If the player has successfully selected a puzzle element within the restricted time (YES in S4), the puzzle information update unit 14 may update puzzle attribute information associated with the selected puzzle element and/or puzzle arrangement information associated with the selected puzzle element and may indicate the arrangement of the selected puzzle element (S5: puzzle information update step). If the player has failed to select a puzzle element within the time restricted by the time restriction unit 15 (NO in S4), the game may end.

The puzzle element condition determination unit 16 may determine whether or not the puzzle attribute information and/or the puzzle arrangement information satisfies a predetermined condition (S6: puzzle element condition determination step). If it is determined that the puzzle attribute information and/or the puzzle arrangement information satisfies the predetermined condition (YES in S6), the puzzle element deletion unit 17 may delete a puzzle element associated with the puzzle attribute information and/or the puzzle arrangement information that satisfies the predetermined condition from the game field (S7). Then, the object moving unit 18 may move an object displayed on or around the puzzle element deleted in the puzzle element deletion step (S8: object moving step). If the object has been moved, the effect producing unit 19 may produce, as a predetermined effect, an effect of changing status information possessed by a game content at a place to which the object has been moved (S9).

The control method described above may include the processes described above with reference to exemplary FIG. 4, and include any process executable by the components included in the control unit 10 as well.

Further exemplary embodiments may be described with reference to exemplary FIG. 5. In exemplary embodiments, a description will be given of only components different from those in the embodiments previously described above. All the components described above may also be included in the further embodiments (or vice versa). The same definitions of the terms in the previously described embodiments are applicable to the following embodiments.

Figure 5:
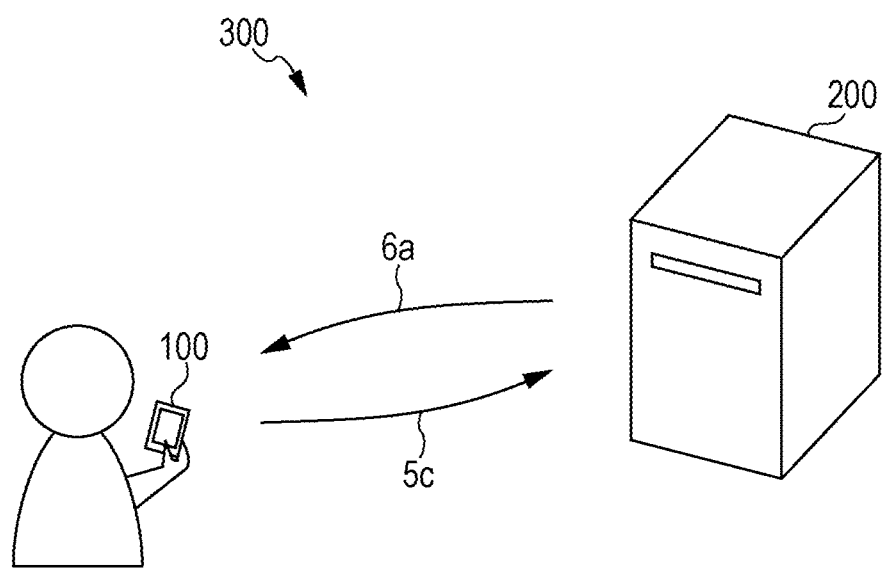
FIG. 5 is a schematic diagram illustrating a configuration of a game system including a mobile terminal and a server device according to an embodiment.

Exemplary FIG. 5 is a schematic diagram illustrating a configuration of a game system 300 including the mobile terminal 100 and a server device 200. As illustrated by way of example in exemplary FIG. 5, in the following description according to exemplary embodiments, the computer may serve as the server device 200 connected so as to be capable of communicating with the mobile terminal 100 via a predetermined network, and the game program may be executed by the server device 200.

The server device (computer) 200 may be an information processing device including the control unit 10, which is included in the mobile terminal 100 in the description of the exemplary embodiments, and capable of executing a game program including some or all of the processes described. The server device 200 may receive instruction information (input data) 5c input by a player via the predetermined network. The server device 200 may output puzzle display information for causing a number of puzzle elements forming part of a puzzle to be displayed in a game field so that at least one puzzle element among the number of puzzle elements is selectable in accordance with the instruction information 5c. The server device 200 may further output object display information for causing an object to be displayed on a screen on which the number of puzzle elements are displayed.

Then, the server device 200 may update the puzzle attribute information associated with the selected puzzle element and/or the puzzle arrangement information associated with the selected puzzle element and indicate the arrangement of the selected puzzle element. After the puzzle attribute information and/or the puzzle arrangement information has been updated, the server device 200 may determine whether or not the puzzle attribute information and/or the puzzle arrangement information satisfies a predetermined condition. If it is determined that the predetermined condition is satisfied, the server device 200 may move an object displayed on or around the puzzle element associated with the puzzle attribute information and/or the puzzle arrangement information to produce a predetermined effect in the game. The display processing unit 20 in the control unit 10 included in the server device 200 may generate screen information 6a concerning a puzzle game screen which can present a result of the series of processes to the player at the desired timing, and transmits the screen information 6a to the mobile terminal 100.

The mobile terminal 100 may receive a result of playing the game (for example, the screen information 6a, etc.) from the server device 200, and display the result on the display unit 50. The result of playing the game may be displayed via a web browser. In this case, the mobile terminal 100 can accumulate information received from the server device 200 in, for example, a predetermined storage area (web storage) incorporated in the web browser.

In the manner described above, the server device 200 may include some or all of the components (in particular, the control unit 10) included in the mobile terminal 100 in the description of the previous exemplary embodiments, and the server device 200 may be configured to transmit an output result of the game to the mobile terminal 100 in response to the input given to the mobile terminal 100. Accordingly, the server device 200 may achieve substantially the same advantages as those achievable by the mobile terminal 100 when the mobile terminal 100 provides the functionality.

The game may be a hybrid game for which some of the processes are handled by each of the server device 200 and the mobile terminal 100 such that web display is provided for a progress screen for the game so that the progress screen is displayed on the mobile terminal 100 in accordance with data generated by the server device 200, whereas native display may be provided for other screens such as a menu screen so that such screens are displayed using a native application installed in the mobile terminal 100.

The game program according to exemplary embodiments may be implemented as a native application executable by the mobile terminal 100. Even in this case, the mobile terminal 100 may be able to access the server device 200, as necessary, and to download and use information related to the progress of the game (for example, information concerning a player, information concerning another player who is a friend of the player, information concerning the cumulative points earned by the player and the items and character assigned to the player, information on the ranking of the player, etc.). In addition, the mobile terminal 100 and another mobile terminal may be connected so as to be capable of communicating with each other (via peer-to-peer communication such as near field wireless communication based on Bluetooth (registered trademark), or the like), and may be synchronized with each other so that the game can be played in multiplayer.

As described in the above examples, the game program, the mobile terminal 100 (computer), and the server device 200 (computer) according to the exemplary embodiments may enable movement of an object displayed on or around a puzzle element whose puzzle attribute information and/or puzzle arrangement information is determined to satisfy a predetermined condition, achieving the advantage of improving the entertainment of a puzzle game.

A control block (for example, the control unit 10) of the mobile terminal 100 and the server device 200 may be implemented by a logic circuit (hardware) formed in an integrated circuit (integrated circuit (IC) chip) or the like, or by software using a central processing unit (CPU). In the latter case, the mobile terminal 100 and the server device 200 may each include a CPU that executes instructions of the game program which is software implementing the individual functions, a read-only memory (ROM) or storage device (referred to as a "recording medium") on which the game program and various kinds of data are recorded in a computer (or CPU) readable manner, a random access memory (RAM) to which the game program is loaded, and so forth. The computer (or the CPU) reads the game program from the recording medium and executes the game program, thereby achieving the object of the exemplary embodiments described herein. As the recording medium, a "non-transitory tangible medium", or "non-transitory computer readable medium", for example, a tape, a disc, a card, a semiconductor memory, or a programmable logic circuit can be used. In addition, the game program may be provided to the computer via any given transmission media capable of transmitting the game program (such as a communication network or a broadcast wave). Exemplary embodiments can be implemented as a data signal on a carrier wave, in which the game program is embodied by electronic transmission.

For example, a game program according to exemplary embodiments may cause a computer (the mobile terminal 100 and the server device 200) to implement a puzzle display information output function, an object display information output function, a puzzle information update function, a puzzle element condition determination function, an object moving function, a puzzle element deletion function, and a time restriction function. The puzzle display information output function, the object display information output function, the puzzle information update function, the puzzle element condition determination function, the object moving function, the puzzle element deletion function, and the time restriction function can be implemented by the puzzle display information output unit 12, the object display information output unit 13, the puzzle information update unit 14, the puzzle element condition determination unit 16, the object moving unit 18 and the effect producing unit 19, the puzzle element deletion unit 17, and the time restriction unit 15, described above, respectively. The details are as described above.

The game program can be written in, for example, a script language such as, but not limited to, ActionScript or JavaScript (registered trademark), an object-oriented programming language such as Objective-C or Java (registered trademark), a markup language such as HyperText Markup Language 5 (HTML5), or the like. The game system 300 including an information processing terminal (e.g., the mobile terminal 100) which includes units that implement some of functions implemented by the game program and a server (e.g., the server device 200) which includes units that implement the rest of the functions different from the some functions is also within the scope of the exemplary embodiments described herein.

The present invention is not limited to the embodiments described above and can be variously altered within the scope defined by the appended claims, and embodiments obtained by suitably combining technical means disclosed in different embodiments are also within the technical scope of the present invention. Further, a new technical feature can be formed by combining technical means disclosed in different embodiments.

The present invention is widely applicable to any given computers such as smartphones, tablet terminals, mobile phones, home video game consoles, personal computers, server devices, workstations, or mainframes.

What is claimed is:

1. A computer implemented method for providing a game program, comprising executing on a processor the steps of:
   displaying, on a display, with a puzzle display information unit in a control unit of a computer, puzzle display information, the puzzle display information comprising a game field in which is provided a puzzle having a plurality of puzzle elements, each of the puzzle elements having at least one puzzle element attribute intrinsic to the puzzle element, each of the plurality of puzzle elements further associated with puzzle arrangement information;
   displaying, on the display, with an object display information unit in the control unit of the computer, object display information, the object display information comprising one or more objects having location information with respect to the game field and movable on the display within the game field and with respect to each of the plurality of puzzle elements;
   receiving, from a user, with an input obtaining unit in the control unit of the computer, at least one manipulation of a selected puzzle element, and determining whether the at least one manipulation of the selected puzzle element is at least one of the set of: a manipulation of the selected puzzle element puzzle attribute information and a manipulation of the selected puzzle element puzzle arrangement information;
   updating at least one of the puzzle arrangement information and the puzzle attribute information associated with the selected puzzle element based on the manipulation of the selected puzzle element; and
   determining, based on a puzzle arrangement state of the puzzle and based on a puzzle attribute state of the puzzle, whether a predetermined condition associated with a puzzle location has been satisfied, and, upon determining that the predetermined condition has been satisfied, moving an object in the at least one objects that is associated with the puzzle location.

2. The computer implemented method for providing a game program according to claim 1, further comprising executing, based on a movement of the object, a predetermined effect.

3. The computer implemented method for providing a game program according to claim 2, wherein the predetermined effect is an effect of changing status information possessed by a game content associated with a place to which the object has been moved.

4. The computer implemented method for providing a game program according to claim 3, wherein the predetermined effect is an effect of applying damage to the game content.

5. The computer implemented method for providing a game program according to claim 3, wherein the predetermined effect is an effect of enabling an attack to be executed against the game content.

6. The computer implemented method for providing a game program according to claim 3, wherein the predetermined effect is an effect of changing movement of the game content.

7. The computer implemented method for providing a game program according to claim 1, wherein the method further comprises:
   receiving, from the user, a selection of at least one specific characteristic to be assigned to the object; and
   assigning the at least one specific characteristic to the object.

8. The computer implemented method for providing a game program according to claim 7, wherein the step of receiving the selection from the user comprises:
   receiving, from the user, with an input obtaining unit in the control unit of the computer, an association between the object and a card of the user; and
   assigning the at least one specific characteristic to the object based on the card of the user.

9. The computer implemented method for providing a game program according to claim 8, further comprising:
   executing, based on the card of the user, a predetermined effect provided on the card of the user.

10. The computer implemented method for providing a game program according to claim 8, further comprising:
    providing a game content associated with a place to which the object has been moved, said game content having a vulnerability to a first predetermined effect and having no vulnerability to a second predetermined effect; and
    wherein receiving, from the user, the association between the object and the card of the user comprises a selection of the first predetermined effect.

11. The computer implemented method for providing a game program according to claim 7, wherein the step of receiving the selection from the user comprises:
    receiving, from the user, a selection of a character to be associated with the object, the character having the at least one specific characteristic; and
    assigning the at least one specific characteristic to the object based on the selection of the character.

12. The computer implemented method for providing a game program according to claim 1, wherein the puzzle location is associated with attribute information, and the user has at least one card associated with attribute information of the puzzle location, and further comprising:
    deleting the puzzle location; and
    executing, based on the puzzle location and the at least one card, a predetermined effect.

13. The computer implemented method for providing a game program according to claim 1, further comprising executing on a processor the step of:
    deleting, from the game field, by a puzzle element deletion unit in the control unit of the computer, a puzzle element provided at the puzzle location; and moving the object associated with the puzzle location after deleting the puzzle element.

14. The computer implemented method for providing a game program according to claim 1, wherein the game field has three-dimensional information concerning width, height, and length, and
wherein the object moving unit moves the object so that the object falls off the game field in a direction away from a viewpoint of the player.

15. The computer implemented method for providing a game program according to claim 14, further comprising:
assigning at least one specific characteristic to the object, wherein the at least one specific characteristic is at least one of the set of: an object falling weight, an object shape, and an object size; and
applying a predetermined effect based on the at least one specific characteristic.

16. The computer implemented method for providing a game program according to claim 1, further comprising:
adjusting a satisfaction state of the predetermined condition based on at least one specific characteristic.

17. The computer implemented method for providing a game program according to claim 1, wherein the input obtaining unit obtains, as the at least one manipulation of a selected puzzle element, a path drawn through an operation on a predetermined input screen of the display, and
wherein the puzzle display information output unit outputs puzzle display information, causing the plurality of puzzle elements to be displayed in the game field so that at least one puzzle element among the plurality of puzzle elements is selectable along the path obtained by the input obtaining unit.

18. The computer implemented method for providing a game program according to claim 1, further comprising executing on a processor the step of:
restricting a time during which the player is able to select the selected one puzzle element by a time restriction unit in the control unit of the computer.

19. A non-transitory computer readable medium for providing a game and control of a computer, that when executed on a processor, performs the steps of:
displaying, on a display, with a puzzle display information unit in a control unit of the computer, puzzle display information, the puzzle display information comprising a game field in which is provided a puzzle having a plurality of puzzle elements, each of the puzzle elements having at least one puzzle element attribute intrinsic to the puzzle element, each of the plurality of puzzle elements further associated with puzzle arrangement information;
displaying, on the display, with an object display information unit in the control unit of the computer, object display information, the object display information comprising one or more objects having location information with respect to the game field and movable on the display within the game field and with respect to each of the plurality of puzzle elements;
receiving, from a user, with an input obtaining unit in the control unit of the computer, at least one manipulation of a selected puzzle element, and determining whether the at least one manipulation of the selected puzzle element is at least one of the set of: a manipulation of the selected puzzle element puzzle attribute information and a manipulation of the selected puzzle element puzzle arrangement information;
updating at least one of the puzzle arrangement information and the puzzle attribute information associated with the selected puzzle element based on the manipulation of the selected puzzle element; and
determining, based on a puzzle arrangement state of the puzzle and based on a puzzle attribute state of the puzzle, whether a predetermined condition associated with a puzzle location has been satisfied, and, upon determining that the predetermined condition has been satisfied, moving an object in the at least one objects that is associated with the puzzle location.

20. A computer system for providing a game program, comprising:
a computer having at least one processor, at least one memory, and at least one display having a screen, the computer further comprising:
a puzzle display information unit, the puzzle display information unit configured to display, on the display, puzzle display information, the puzzle display information comprising a game field in which is provided a puzzle having a plurality of puzzle elements, each of the puzzle elements having at least one puzzle element attribute intrinsic to the puzzle element, each of the plurality of puzzle elements further associated with puzzle arrangement information;
an object display information unit, the object display information unit configured to display, on the display, object display information, the object display information comprising one or more objects having location information with respect to the game field and movable on the display within the game field and with respect to each of the plurality of puzzle elements;
an input obtaining unit, the input obtaining unit configured to receive, from a user, at least one manipulation of a selected puzzle element, and configured to determine whether the at least one manipulation of the selected puzzle element is at least one of the set of: a manipulation of the selected puzzle element puzzle attribute information and a manipulation of the selected puzzle element puzzle arrangement information;
a puzzle information update unit configured to update at least one of the puzzle arrangement information and the puzzle attribute information associated with the selected puzzle element based on the manipulation of the selected puzzle element;
a puzzle element condition determination unit configured to determine, based on a puzzle arrangement state of the puzzle and based on a puzzle attribute state of the puzzle, whether a predetermined condition associated with a puzzle location has been satisfied; and
an object moving unit configured to move an object in the at least one objects that is associated with the puzzle location upon a determination, by the puzzle element condition determination unit, that the predetermined condition has been satisfied.

* * * * *